Oct. 1, 1974      N. LAING      3,839,533
SPHERICAL BEARING ELEMENTS
Filed June 25, 1971
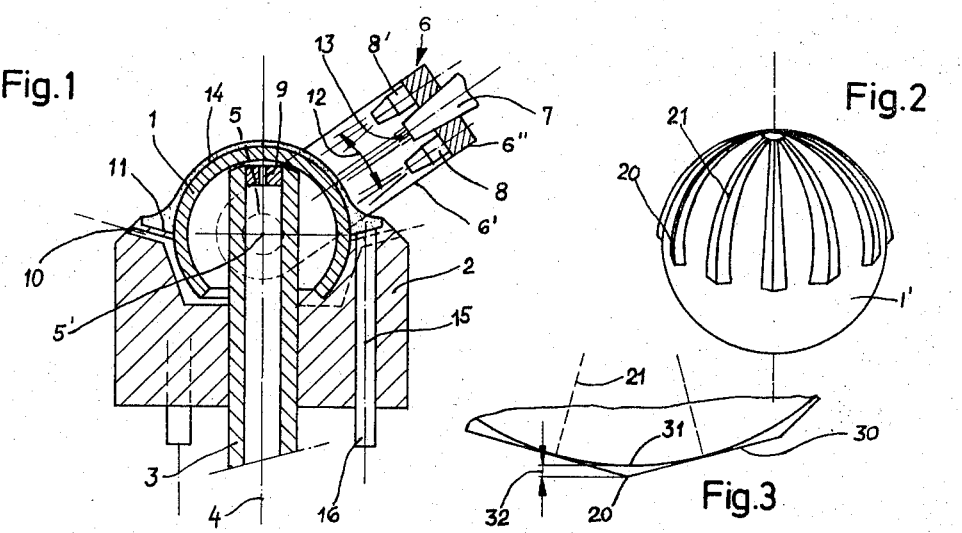

United States Patent Office 3,839,533
Patented Oct. 1, 1974

3,839,533
SPHERICAL BEARING ELEMENTS
Nikolaus Laing, 7141 Aldingen, near Stuttgart,
Hofener Weg 35–37, Germany
Filed June 25, 1971, Ser. No. 156,897
Claims priority, application Austria, July 1, 1970,
5,901/70
Int. Cl. B28b 1/32
U.S. Cl. 264—309                              6 Claims

ABSTRACT OF THE DISCLOSURE

A method of making a bearing shell of a spherical bearing is disclosed. The bearing shell in cooperation with a spherical bearing body, for example, a ball, serves as a support for both thrust and journal loads. One application of the bearing structure is in connection with roto-dynamic machine rotors.

BACKGROUND OF THE INVENTION

Bearing shells comprising the concave elements of spherical bearings which may be used for load support of magnetically sustained pump impellers have previously been described. The description has been directed to constructions of bearings having smooth form and those having an interrupted form. While smooth bearings lead to semi-dry friction, bearings of interrupted surface generate a hydrodynamic load-carrying layer. However, in both instances, the load-carrying capacity depends to a considerable degree upon the clearance between complementary interfaces of the bearing. Thus, the manufacturing accuracy is an important consideration in the manufacture of the bearing components.

Methods are known for the carrying out of very precise shaping of the convex spherical bearing element through the use of cutting tools. However, the practice of shaping concave spherical bearing elements by cutting tools whereby the latter provide a comparable precision surface complementary to that of the convex member is extremely difficult. This is particularly the case when very hard or chemically corrosion-resistant materials are employed.

SUMMARY OF THE INVENTION

The present invention provides a method of making a bearing shell of a spherical bearing which avoids the difficulties and disadvantages inherent in the fabrication of the concave spherical bearing member by the use of cutting tools. The present invention generally relates to a method of deposition of bearing element material on a mold ball and uniform build-up of material on the mold ball. The mold ball may be of any desired predetermined diameter. The present invention envisages that the deposition of bearing element material may be carried out by the use of any one of flame-spraying, plasma-spraying, electroplating or other deposition techniques. By means of such processes, all materials of special merit for pump operation, such as sintered ceramics, molybdenum, nickel, nickel alloys, chromium and precious metals, titanium carbides or tungsten carbide, which may be deposited in a metal matrix may be applied. The reference to pumps recognizes that spherical bearings which are run immersed in the pumped liquid must be immune from or not deleteriously affected by such liquid. In that sense the present invention is particularly directed to the manufacture of a spherical bearing for use in pumps wherein the spherical bearing may be immersed.

According to the present invention, a mold ball having the same or a slightly larger diameter than the ball to be used in the bearing first is covered or coated with a release agent. Thereafter, the mold ball is bombarded with metal particles using one of the aforementioned deposition processes. The metal particles, if hot, are immediately cooled upon hitting the target surface. To this end, the present invention envisages simultaneous withdrawal or transfer of heat from the metal particles by powerful cooling of the coated mold ball either by liquid air or a refrigerating salt solution or by an inert gas or air. The cooling medium may be blown over the coated surface or else introduced into the confines of the mold ball thereby to provide heat transfer through the wall of the mold ball. By the immediate cooling operation subsequent shrinkage of the bearing shell may be greatly reduced or substantially eliminated. Therefore, the concave bearing shell of the spherical bearing which is formed through deposition will be a precise "mirror-image" replica of the convex mold ball surface. The concave bearing shell will provide a bearing clearance substantially equal to the thickness of the layer of release agent.

The present invention envisages a relative cyclic movement of the mold ball and the source of deposition energy. In the present invention the movement relative to each other will be more particularly described as rotation of the mold ball and concurrent pivotal movement of the source. In this manner a more uniform build-up of deposited material is achieved. Also, through the uniform build-up a substantial elimination of distortion of the bearing shell is realized.

Deposition of bearing element material by electroplating or chemical plating procedures may be employed in situations where a thin, superficial layer of deposited material is desired adjacent the surface of the mold ball. High quality material such as rhodium, nickel, platinum, gold bearing bronze or chromium are suitable substances. In this type of manufacture the mechanical load carrying capacity of the bearing shell is intended to be provided by a layer which is formed upon the initially deposited layer. The outer layer will be of thicker cross-section and serves as a foundation layer. The thick foundation layer may be formed by various methods. To this end the foundation layer may be deposited by electroplating or by either plasma or flame spraying techniques. The foundation layer, also, may be cast from a low melting point metal or synthetic resin. Preferably, the foundation layer is formed by either flame or plasma spraying.

Advantages may be found in an arrangement of cooling ducts which traverse the foundation to cool the superficial surface by a liquid coolant.

Bearing shells with semi-dry friction in accompaniment with ball bearings formed of sintered corundum, chromium, hard nickel, or precious metal-coated ordinary meals have been found beneficial when used at low rotational speeds and, also, when the bearing is immersed in a liquid with an abrasive suspense.

Electrochemical or purely chemical plating techniques when coating with nickel have been found to be beneficial or advantageous. This is particularly the case in situations in which the deposit subsequently is hardened by heat treatment.

It may be desirable to form one of the interface surfaces of the bearing with grooves or recesses. This is particularly desirable if the bearing is intended for use with development of high surface speeds or in an environment where the bearings will be exposed to a liquid of low viscosity. The grooves or recesses promote hydrodynamic pressures. The present invention makes provision for such formation on an interface surface. To this end, the invention provides for the formation of protuberances in the form of ridges or in the form of simple projections on the mold ball. In this manner the complementary surface of the bearing shell, as desired, will display a grooved pattern or a dimpled pattern respectively. In either case, the formation may be accomplished without resort to subsequent machining.

A coating of a release agent to prevent adhesion of the deposited material to the mold ball is required. This is the case irrespective of the use of any of the aforementioned deposition techniques. When using a flame spraying or plasma jet process for deposition of bearing material the release agent suitably may be a high boiling point hydrocarbon or a silicone oil. When using an electroplating process for deposition of bearing material an albumen compound capable of absorbing water may be more suitable.

DESCRIPTION OF THE DRAWING

The accompanying drawing forms a part of the present application and serves to assist in describing the invention. By this drawing FIG. 1 illustrates substantially in vertical section and in diagrammatic form a structure by which a bearing shell may be made in accordance with one embodiment of the invention;

FIG. 2 illustrates in perspective a bearing mold which may be utilized in the formation of a bearing shell;

FIG. 3 illustrates in enlarged view the configuration of projections on the bearing mold of FIG. 2;

FIG. 4 illustrates in a manner similar to FIG. 2 a further bearing mold which may be utilized in the formation of a bearing shell;

FIG. 5 illustrates in a manner similar to FIG. 2 yet another bearing mold which may be utilized in the formation of a bearing shell;

FIG. 6 illustrates substantially in vertical section and in diagrammatic form a view of an electroplated bearing shell made according to another embodiment of the invention; and FIG. 7 illustrates substantially in vertical section and in diagrammatic form a view of an electroplated bearing shell made according to a further embodiment of the invention.

DETAILED DESCRIPTION OF THE PREFERRED EMBODIMENT

Apparatus for forming a bearing shell according to one embodiment of the present invention may be seen in FIG. 1. The apparatus includes structure for supporting a mold ball 1 which may take the form of a hollow, spherical element. In FIG. 1, the element provides an opening within an otherwise smooth outer surface. The supporting structure may take the form of a spindle 2. The mold ball is set into the spindle in a manner as is illustrated. To this end the mold ball will be supported for movement as will be discussed. The disposition of the mold ball is such that a significant portion of the mold ball spherical surface is exposed to the flow of bearing material, as will be described, also.

The mold ball is set into the spindle in a disposition such that the opening is directed downwardly. A shaft 3 of hollow construction projects through the opening and into the confines of the mold ball. The shaft is fixedly connected to the spindle (by means not shown) for conjoint movement about the axis 4. The shaft may be journelled in any suitable bearing structure (not shown) and driven by drive means (not shown).

The apparatus further includes a yoke 6 supported for pivotal movement relative to the spindle 2. The yoke includes at least one elongated arm 6' directed toward for pivotal movement about a shaft 5 whose axis is perpendicular to the plane of the Figure and, if projected, would pass through the center of the ball mold and through the axis 4 of shaft 3. The intersection is denoted by the numeral 5'. Thus, the yoke 6 is pivotable about an axis perpendicular to the axis of shaft 3.

The yoke 6 supports an offset end member 6''. A spray head 7 and cooling nozzles 8 and 8', if the latter are required, are mounted on the offset end member. A cooling liquid, for example, liquid air, may also be conducted to the confines of mold ball 1 through the hollow of shaft 3. The liquid air expands through a nozzle formed in a plug 9 disposed within the shaft opening and provides cooling through the wall of the mold ball 1. After cooling the conical region 11 the cooling medium, i.e., the liquid air, emerges from the fixture through a number of bores 10.

Disposition of bearing material is accompanied by relative movement of the mold ball and source of deposition energy. To this end, the yoke 6 spray head 7 is rocked about the axis of shaft 5 in the directions of motion indicated by the arrows 12. The spindle 2 and mold ball 1 are simultaneously rotated about the axis 4. In this manner, a bearing shell 14 having a uniformly built up wall is manufactured. Operation may continue throughout a period as required for desired material build up to occur.

Ejection of the bearing shell 14 from the set position in the spindle 2 may be accomplished by provision of pins 16. The pins are movable within opening 15 of spindle 2. The pins are arranged in annular array around the axis 4 of shaft 3 and spaced from any one of the bores 10. Adhesion between the newly formed bearing shell and ball mold is prevented by use of the release agent, as discussed.

FIG. 2 illustrates a modified mold ball 1' for forming a bearing shell having a surface including one or more grooves. To this end, the mold ball 1' includes a plurality of spaced ribs 20.

FIG. 3 illustrates a portion of mold ball 1', in enlarged dimension, further illustrative of the ribs 20 and their formation by edges of single curvature surface 30 which follows the meridians 21. The distance 32 between the surface 31 of the mold ball and the raised edge of ribs 20 is equal to between one hundreth and one ten thousandth of the mold ball diameter according to the viscosity of the liquid handled.

FIG. 4 illustrates a further modification of mold ball 1'' for forming a bearing shell having a surface including one or more dimples. To this end, the mold ball 1'' includes a plurality of generally spherical protuberances 40. The height 41 of such protuberances is of the same order of magnitude as the height 32 of the ribs 20 of FIGS. 2 and 3. The arrangement of the protuberances permits parting of the bearing shell from the mold ball 1'' after the desired build-up of bearing material thereon.

FIG. 5 illustrates a further modification of mold ball 1''' for forming a bearing shell having a surface including one or more spirohelical grooves. To this end, the mold ball 1''' includes a plurality of spirohelical rib-like projections 50. The surfaces 51 and 52 forming the boundary of projections 50 are parallel to the axis of rotation 53 of the mold ball 1'''. In this manner the existence of undercuts or re-entrants which would impede the ejection or withdrawal of the bearing cup is avoided. This feature, owing to the substantial exaggeration displayed in the figure in connection with the dimension of the ribs, is not readily apparent. The radial dimension of the projections should be comparable in design to the ribs of the FIGS. 2 and 3 modification.

FIG. 6 is a view in cross-section of a bearing shell 60 formed by an electroplating procedure. The bearing shell is supported by a rigid foundation member 61 having a generally spherical recess 63. The bearing shell is supported within the recess with an open end abutting an internal collar 62 of the member. A substance 64 is received within the recess for supporting the region of the bearing shell below the open end. The substance may be formed of rubber, organic polymer, a graphite paste or metal such as lead or a low melting point alloy, for example, one of the well known eutectics, thereby to provide a plastic, or soft or elastic supporting surface. Pressure executed on the bearing shell 60 by the substance 64 and consequently the radius 66 of the spherical bearing shell may be controlled by adjustment of screw 65. A pair of sealing rings 67 and 68 prevent entry of fluid into and escape from the recess. The sealing rings, respectively, may be provided around the screw 65 and in the region of the collar 62.

FIG. 7 illustrates a further bearing shell 70 which may be formed by electroplating with, for example, platinum, hard nickel or hard chromium. The external surface of the bearing shell may be covered with granulated metal 71 and adhered by solder. The bearing shell is cast into metal or resin 72. Webs 73, 74 may simultaneously be cast on the bearing shell to provide added strength characteristics.

A bearing shell 14 may be manufactured by means of the following process. The mold ball 1 is initially coated with a release agent, for example, a high boiling point oil. The mold ball is then rotated by the spindle 2 while simultaneously molten particles of a bearing element material are deposited by means of the sprayhead 7 onto the mold ball 1. At the same time the sprayhead is pivoted or oscillated about the shaft whose projected axis passes through the center of the mold ball and intersects at 5' with axis 4. The mold ball 1 is cooled during the deposition of the bearing element particles by means of a coolant, preferably a liquid cryogenic material. The coolant passes into the mold ball through the hollow shaft 3 and the nozzle in plug 9, down through the interior sides of the mold ball and out of the spindle 2 through the bores 10. Air at the same time passes through the stem and admixes with the coolant to also provide a cooling feature. In addition a coolant gas may be blown over the mold ball by nozzles 8 and 8' mounted alongside the sprayhead. The sprayhead 7 may comprise a flame spray or a plasma spray device. The particles sprayed may be of a group including molybdenum, nickel, a carbide of titanium tungsten and silicon. After the bearing shell has been built up to the desired thickness, the sprayhead 7 is turned off and the bearing shell 14 removed from the spindle by means of ejector pins 16.

The procedure for making concave spherical bearing shells having grooves or depressions complementary to the projections of the mold balls shown in FIGS. 2, 4, and 5 is the same as that described above with the spherical mold ball 1.

I claim:

1. A method of making a concave spherical bearing element having a substantially uniform thickness throughout comprising:
   (a) coating a spherical convex mold outer surface which is complementary to a bearing surface of the element to be produced with a release agent, said mold being supported on a vertical axis passing through the center of the mold;
   (b) depositing particles of molten bearing element material on said coating through movement of the particles substantially toward the mold from a source which extends radially of the mold;
   (c) rotating said mold about said vertical axis in a manner such that the molten bearing element material builds up evenly on the coating;
   (d) pivoting said source about a second axis in a manner such that the molten bearing element material builds up evenly on the coating, said second axis being perpendicular to said vertical axis and passing through said vertical axis; and
   (e) cooling said molten material below its melting point whereby said material will solidify and build up evenly on the coating, said depositing, cooling, pivoting and rotating steps occurring simultaneously.

2. A method according to claim 1 wherein said mold is hollow and said molten bearing element material is cooled below its melting point by cooling the interior surface of the mold with a liquid cyrogenic material.

3. A method according to claim 1 wherein said mold is hollow and said molten bearing element material is cooled below its melting point by passing a coolant gas over the interior surface of the mold.

4. A method according to claim 1 wherein said molten bearing element material is deposited by flame spraying.

5. A method according to claim 1 wherein said molten bearing element material is deposited by plasma spraying.

6. A method according to claim 1 further comprising:
   (f) ejecting said bearing element from said mold after it has been formed.

References Cited

UNITED STATES PATENTS

| | | | |
|---|---|---|---|
| 3,288,623 | 11/1966 | Colton | 117—46 FS |
| 3,491,423 | 1/1970 | Haller | 29—182.5 |
| 3,396,220 | 8/1968 | Dewsnap et al. | 264—67 |
| 3,644,607 | 2/1972 | Roques et al. | 264—81 |
| 3,597,241 | 8/1971 | Perugini | 117—46 FS |
| 3,547,720 | 12/1970 | Jones | 264—62 |
| 3,020,182 | 2/1962 | Daniels | 264—62 |
| 3,055,769 | 9/1962 | Herron et al. | 117—46 FS |
| 3,399,253 | 8/1968 | Eschenbach et al. | 264—62 |
| 3,429,962 | 2/1969 | Krystyniak | 264—81 |
| 3,428,374 | 2/1969 | Orkin et al. | 106—65 |
| 2,974,388 | 3/1961 | Ault | 264—59 |
| 3,497,272 | 2/1970 | Caubet | 308—237 |
| 3,711,171 | 1/1973 | Orkin et al. | 308—238 |

FOREIGN PATENTS

| | | | |
|---|---|---|---|
| 708,565 | 4/1965 | Canada | 117—46 FS |

ROBERT F. WHITE, Primary Examiner

J. R. HALL, Assistant Examiner

U.S. Cl. X.R.

264—310